J. B. BLAIR, DEC'D.
O. M. BLAIR, ADMINISTRATRIX.
AUTOMOBILE DIRECTION INDICATOR.
APPLICATION FILED SEPT. 20, 1917.
1,424,070.
Patented July 25, 1922.
3 SHEETS—SHEET 1.
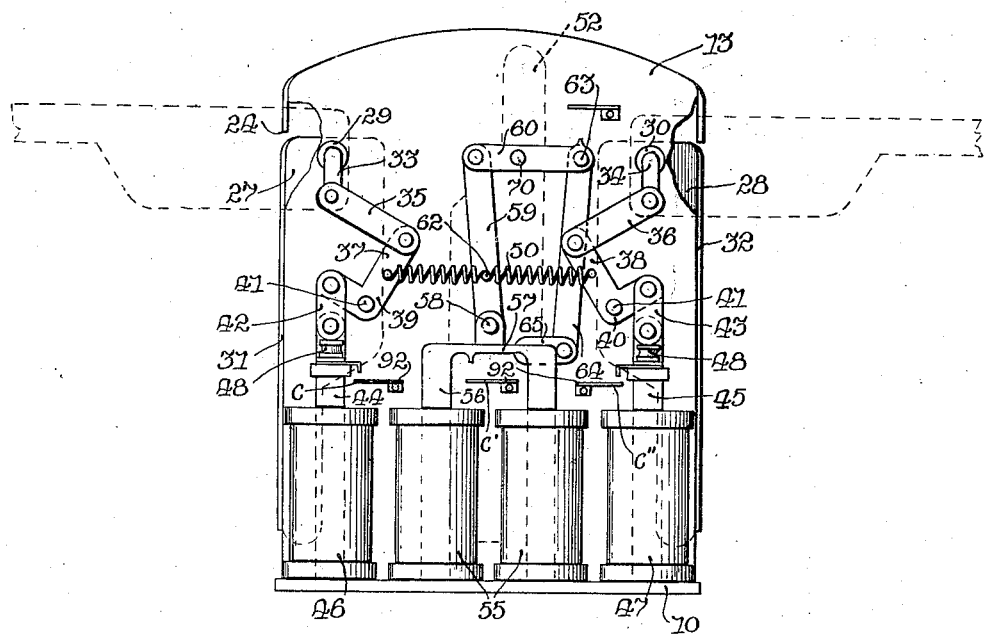
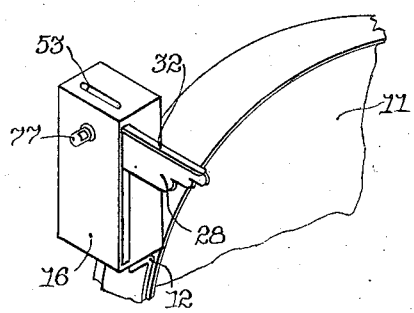
Inventor
James B. Blair
By Brown, Hanson & Boettcher
Attorneys

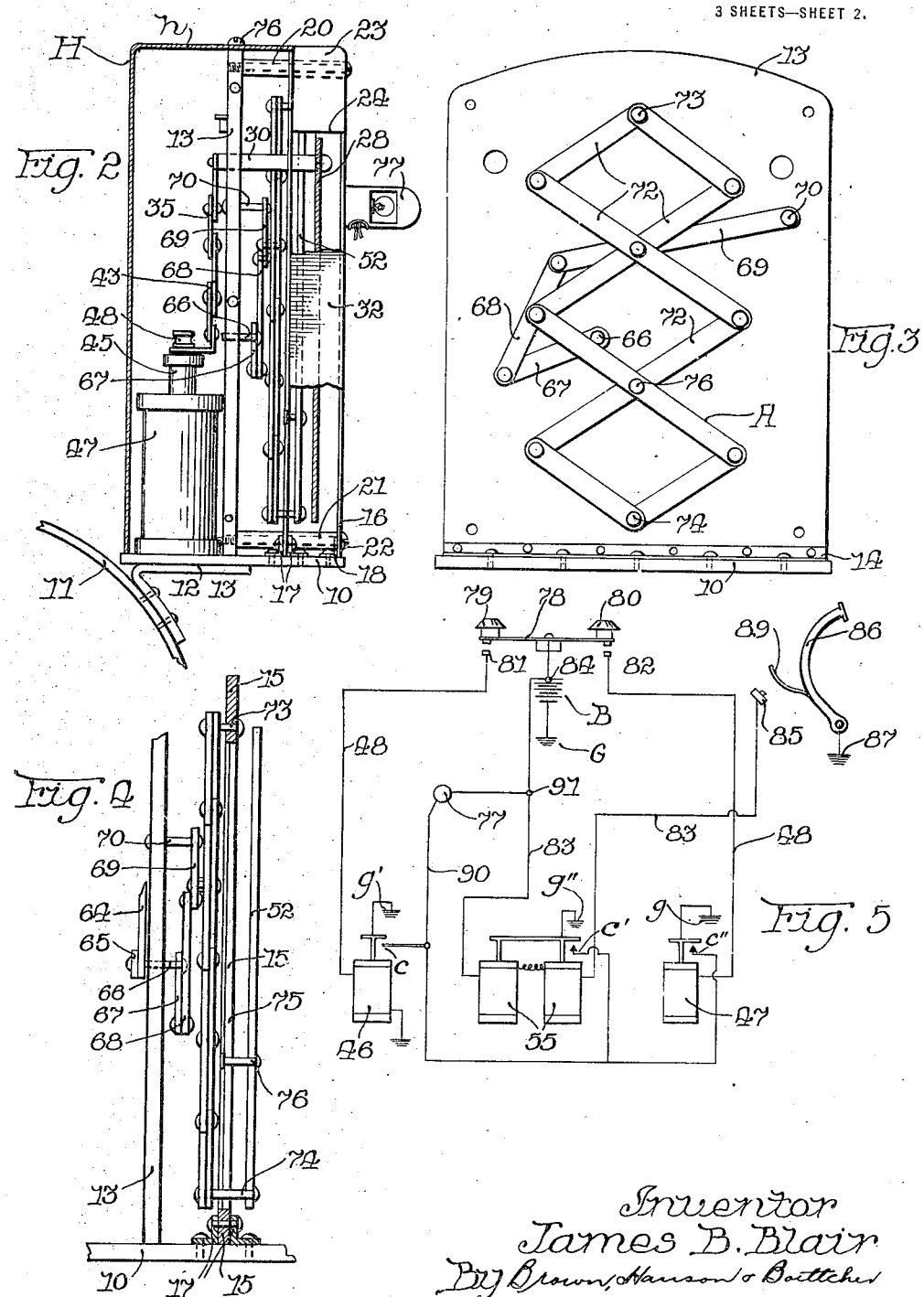

J. B. BLAIR, DEC'D.
O. M. BLAIR, ADMINISTRATRIX.
AUTOMOBILE DIRECTION INDICATOR.
APPLICATION FILED SEPT. 20, 1917.

1,424,070.

Patented July 25, 1922.
3 SHEETS—SHEET 3.

Inventor
James B. Blair
By Brown, Hanson & Boettcher
Attorneys

UNITED STATES PATENT OFFICE.

JAMES B. BLAIR, OF DECATUR, ILLINOIS; ORA MUELLER BLAIR ADMINISTRATRIX OF SAID JAMES B. BLAIR, DECEASED.

AUTOMOBILE DIRECTION INDICATOR.

1,424,070. Specification of Letters Patent. Patented July 25, 1922.

Application filed September 20, 1917. Serial No. 192,268.

*To all whom it may concern:*

Be it known that I, JAMES B. BLAIR, a citizen of the United States, residing at Decatur, in the county of Macon and State of Illinois, have invented a certain new and useful Improvement in Automobile Direction Indicators, of which the following is a full, clear, concise, and exact description, reference being had to the accompanying drawings, forming a part of this specification.

The present invention relates broadly to signalling and has particular reference to an improved automobile direction indicator.

An object of my invention is to provide an indicator of the class described adapted to indicate both in the front and rear of an automobile the direction which the driver intends to take. My invention is adapted for disposition upon the radiator and upon the rear mud-guard to indicate direction, the rear signal being provided with a stop indicating arm operated by the application of the brake.

Another object of my invention is to provide a device of the character described which is electro-magnetically operated, but may be mechanically operated, if so desired.

A further object of my invention is to provide an indicator of the class described which may be easily attached to any motor vehicle and which, while the signal is sufficiently conspicuous to attract attention when necessary, presents a neat finished appearance on the vehicle and does not destroy the generally neat appearance of the machine.

Other objects and advantages will appear from the following detail description and the claims, taken with an inspection of the accompanying drawings.

Figure 1 is a rear elevation of a signaling device embodying the improvements of my invention;

Figure 2 is a side elevation of the same with the cover shown in section;

Figure 3 is a detached elevational view of the inside surface of the rear wall;

Figure 4 is a fragmental vertical section, lever mechanisms being shown in elevation;

Figure 5 is a diagrammatic view of the preferred arrangement of circuits;

Figure 6 is a detail perspective view of the signaling device applied to the rear mud guard of an automobile;

Figure 7:
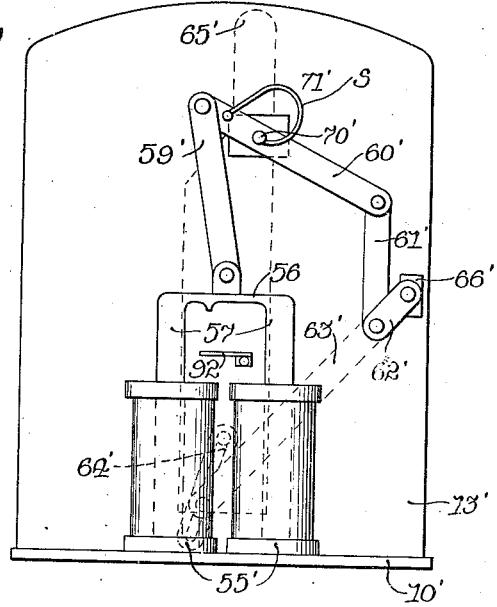
Figure 7 is a rear elevation of a modified form of my invention.
Figure 8:
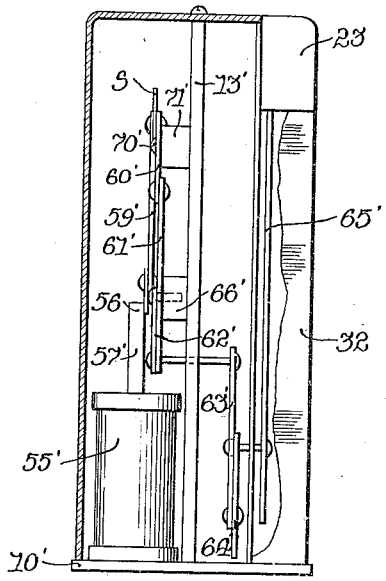
Figure 8 is a side elevation of the same.

Referring more particularly to the drawings, the base of the indicator is designated 10 and is mounted on the rear mud guard 11 by means of a bracket 12. It is intended that the indicating device of my invention be applied in one form, to the rear mud guard, and in another form to be described later, to the radiator or hood of the vehicle, the former signal being employed for indicating the direction to be taken to drivers following in the rear and the indicator on the front serving to indicate to pedestrians and others the intended direction to be taken. The base 10 supports a rear wall 13 of insulating material, an angle piece 14 serving to connect and rigidly support the wall 13 on said base. An intermediate wall 15 is provided and a front wall 16, said walls being formed of sheet metal. Angle pieces 17 and 18 serve to connect and rigidly support the walls 15 and 16 on the base 10 by means of rivets or the like. The walls 13, 15 and 16 are maintained in rigid spaced relation to each other by means of sleeve members 21 carried by retaining screws 22, the latter passing through the walls 15, 16 and engaging with the wall 13, as best shown in Figure 2. There are four of these screws provided, one at each corner of the device, but it is, of course, understood that any number or arrangement of the fastening screws may be used. The space between the walls 15 and 16 at the top, is closed by means of a cover member 23 for the purpose of excluding dust from the interior of the device. The top 23 terminates at 24 as best shown in Figure 2, to permit projection of the indicating arms as will be hereinafter described.

On the rear signal member there are disposed three distinct and independently operating indicating members, two of these members being for the purpose of indicating direction and the other member for the purpose of indicating the intention of the driver to come to a stop, the latter indicating means being electrically connected to the brake mechanism of the vehicle so that when the brake is applied an indication will be given at the rear notifying those who follow that the driver intends to stop.

To simplify the description I will first describe in detail the direction indicating mechanism with the assumption that the stop indicating device is omitted, as would be the case in the form of the device as applied to the hood or radiator of an automobile. As best seen from Figure 1, the direction indicating element comprises arms 27 and 28 pivotally mounted on crank-shafts 29 and 30, the latter passing directly through the rear wall 13 and the intermediate wall 15, said walls serving as bearing means for said shafts. The arms 27 and 28 may be formed in the general shape of a hand so as to be conspicuous when projected from the housing. The outer edges of the hands or arms 27 and 28 are provided with cap flanges 31 and 32, respectively, said flanges serving to close the openings in the sides of the housing when said arms are withdrawn from indicating position. This presents a neat appearance as well as excluding dust and dirt from the interior of the housing as much as possible.

Crank members 33 and 34 are formed on the free ends of the shafts 29 and 30, respectively, said cranks being connected by means of links 35 and 36 to the long arms 37 and 38 of bell crank levers 39 and 40, respectively, said bell crank levers being pivoted at the points 41, 41 to the rear face of the wall 13. The other arms of the bell crank levers are pivotally connected by means of link members 42 and 43 to the cores 44 and 45 of solenoids 46 and 47 mounted on the base 10 behind the wall 13. Binding nuts 48, 48 serve to connect the solenoids to short pieces of metal which are in turn connected to the links 42 and 43 as best shown in Figure 1. The solenoids 46 and 47 receive current from a circuit as shown in Figure 5 which is described in detail hereinafter. A coil spring 50 of the tension type is disposed between the arms 37 and 38 of the bell crank levers and is connected thereto to exert a force inwardly thereon. The spring serves another purpose which will hereinafter be set forth in detail. The form of the invention thus far described is adapted for disposition on the front of the machine to indicate to pedestrians and others the direction which the driver intends to take. There are other features which are embodied with the forward signal and which will be described in detail later.

When the signal is used at the rear end the arms 27 and 28 and the operating mechanism therefor is supplemented with a stop indicating arm 52, best shown in Figure 4 and shown in dotted lines in Figure 1. The arm or hand 52 is adapted to be projected vertically through an opening 53 formed in the top of the housing for the purpose of indicating to the drivers of the vehicles following that the driver of the first machine intends to slow down or stop. The projecting or actuating mechanism for the arm 52 comprises preferably a pair of solenoids 55 mounted on the base 10 between the solenoids 46 and 47, said solenoids 55 receiving the cores 56 of an armature 57, said armature 57 being connected at 58 to a link member 59. The link member 59 is connected at its free end to a rocking arm 60 pivoted at 70 to the rear wall 13 of the housing. The arm 59 is connected with the spring 50 at the point 62. Thus, the spring 50 serves as means for returning either the arms 27 and 28 or the arm 52 after an actuation by their respective solenoids. The rocking arm 60 is connected at 63 to a link 64, the lower end of said link being connected to a crank 65 carried by forwardly extending shaft 66, the inner end of said shaft carrying an arm 67 connected at its free end to a link 68, the opposite end of the link being connected to a combination lever 69 pivotally mounted at 70 to the front face of the wall 13. Motion is imparted from the combination lever 69 to the stop indicating arm 52 by means of a lazytongs designated A in its entirety and composed of interconnected links 72. The lazy-tongs A is anchored at its upper end at 73 to the front face of the wall 13, the lower end of the lazy-tongs being connected, by means of the pin 74, to the arm 52 as best shown in Figure 4. The pin 74 extends through a slot 75 formed in the intermediate wall 15, a pin 76 carried by the arm 52 and arranged in said slot serving to guide the arm in its vertical movement.

A hood H is provided, the same being shown in section in Figure 2, said hood being adapted to house the solenoids and to protect the lever mechanism from the rear wall, the top wall $h$ of said housing extending over the wall 13 and the space between said wall and the intermediate wall 15 to prevent the entrance of dust. Fastening screws 76 serve to prevent dislodgment of the hood H. Of course, the hood extends along the sides of the housing to close the same.

A lamp 77 of any suitable design is mounted on the front wall of the indicator and automatic mechanism is provided for periodically lighting the lamp to illuminate the indicating hand when extended. As the construction of the device provides for ejecting signal arms from three sides thereof, it is quite important to mount the lamp 77 in a position to provide the necessary illumination for any one or all of the arms should they be operated to move into visible position simultaneously. The lamp 77 therefore possesses the distinguishing feature of directing the rays against the face of each signal arm from outside the casing, which feature permits a single lamp to give sufficient light to each arm. The circuit for controlling the operation of the solenoid and the illumination of the hand is illustrated diagrammatically in Figure 5. The circuit includes a primary battery or a storage battery B, one end of which is grounded to the chasis of the automobile at G. The other end of the battery is led to a spring arm 78, the free ends of which carry buttons 79 and 80.

The solenoid 46 and 47 are interposed in conductors 48, the free ends of the conductors being grounded to the automobile chassis as at $g$ and $g'$ the opposite ends of said conductors terminating beneath the free ends of the spring arms 78 as at 81 and 82, respectively. Thus, it will be seen that upon the depression of one or the other of the buttons 79 or 80 the solenoids 46 or 47, respectively will be energized. This action will draw the cores 44 and 45 into the solenoid and through the bell crank and link members impart rotation to the shafts 29 or 30, as the case may be, to give an indication of direction. The solenoids 55 are interposed in a conductor 83, one end of the conductor being connected at 84 to one side of the battery B and the other end of the conductor terminating at 85 beneath the brake pedal 86, the pedal being grounded as at 87 to the chassis. A spring member 89 is carried by the pedal 86 to engage the terminal 85. Thus when the brakes are applied contact will be formed between the spring member 89 and the terminal 85, causing the current to flow from the battery through the conductor 83 to the solenoid and returning through the ground $g''$ back to the battery.

In order to illuminate the indicating arms when projected from the housing I provide the lamp 77 hereinbefore referred to. The lamp 77 is interposed in a conductor 90 connected at 91 to the conductor 83. The conductor 90 forms a common distributing means to connect the lamp with the circuit closures $c, c' c''$, and such circuit closures being best shown in Figure 1 comprising strips 92 carried by the wall 13 beneath the upper ends of the cores 44 and 45 and the armature 57. Thus it will be seen that when one or the other of the solenoids is energized one or the other of the circuit closures $c, c'$ or $c''$ will be closed, lighting the lamp. The cores and lever mechanisms are all grounded to the automobile chassis through the mudguard so that no conductors are needed for finding the connection between one side of the circuit closures and the ground of the battery other than the frame of the automobile.

In Figure 7 I have illustrated a modified form of my invention, the base 10' being provided and the intermediate wall 13'. The wall 13' corresponds to the wall 13 in the first form of my invention described. In this form of the invention I provide a modified form of mechanism for projecting the stop indicating signal member from the housing, this mechanism comprising a rocker arm 60' pivotally mounted at 70' on the bearing member 71'. The inner end of the rocker arm 60' is connected by means of a link 59' to the top portion 56' of the armature 57' of the electro-magnets 55'. The opposite end of the rocker arm 60' is pivotally connected to a link 61', which is in turn pivotally connected to the crank portion 62'. The crank 62' is mounted in connection with a lever 63', said lever being in turn connected by means of a link 64' to the signal member 65', which corresponds to the signal member 52 of the first form of my invention described. The lever 63' is bent at right angles and continues through the intermediate wall 13', the free end portion of said lever being connected to the crank 62'. An elongated bearing 66' is provided so that the mechanism does not interfere with the mechanism for the direction indicators, which in this instance are identical in construction with the form of the invention hereinbefore described. These have not been shown in Figure 7, in order to avoid confusion. A spiral spring member S is provided to assist in returning the armature and the signal member to normal condition after an indicating operation is completed. The electro-magnets may be energized in the same manner in which the electro-magnets are energized in the first form of the invention hereinbefore described. Of course, it will be understood that the illuminating means and other attachments employed in the preferred form of the invention may be applied in the modified form.

From the foregoing taken in connection with the accompanying drawings, it will be clear that I have provided a simple, compact and efficient signalling device for automobiles and other purposes, which is cheap to manufacture, strong and durable and easily installed on any modern motor vehicle. Various methods of mounting the housing may be employed, but I have not shown any other than the bracket 12 in view of the fact that it is optional with the manufacturer and user whether one or another fastening means is to be employed. In the actual device very little space is taken up by the installation of the same and the arms project when in signalling position, but a few inches from the housing, sufficient to attract attention and still sufficiently inconspicuous not to detract from the beauty or mar the lines of the automobile. It will be apparent that by the provision of the lazy-tongs mechanism a stroke is imparted to the hand which woud not be otherwise obtainable from an electromagnet or solenoid of such a small size as that shown. The device requires no attention whatsoever and no injurious effect caused by the heat of the electromagnet after an extended term of use will be had owing to the fact that the whole device is of metal with the exception of the wall 13 which is of non-inflammable insulating material, but 3 or 4 amperes are required for operation and therefore the danger from short circuit is reduced to a minimum. Any other form of lamp may be provided other than that shown in the drawings but it is desirable that a hood be employed on the lamp which tends to deflect the rays in radial lines so as to strike the free hand as projected from the housing. Of course, the device used on the front of the machine as hereinbefore pointed out omits the stop indicating hand. My indicator as described is adapted to indicate the movement of an automobile either to the right or to the left, or a slowing down of the automobile, or no motion at all. And I am enabled to provide a very compact and sightly device by reason of my improved construction and the method of operating, housing and illuminating the several indicating members. If desired, the device may be mechanically operated instead of electrically. The gist of the present invention not only resides in the various parts employed, but also in the arrangement of those parts whereby a device is provided having the parts most apt to be damaged by moisture, grease and dirt disposed in compartments closed off from atmospheric influences. I consider the provision of these compartments novel, as it segregates the operating mechanism from the signal arms which are constructed to resist severe weather conditions. I reserve the right to make changes in the detail structure of the device such as do not depart from the spirit and scope of the invention as claimed.

I claim:

1. In an indicator, the combination with a plurality of electromagnets adapted to be actuated upon change of motion of a vehicle, of a series of levers connected at one end to said electromagnets, crank arms connected at the opposite end to said levers, signal members on said crank arms indicating change of motion either lateral or cessational, two of said signal members projecting outwardly for lateral change and the other projecting upwardly for cessational change and common spring means for assisting the return of said signal members.

2. In a signal of the class described, a housing having an intermediate wall, a signal member for indicating change of motion, said signal member being adapted to be projected bodily in a vertical direction above the top of said housing, a pin journaled in said intermediate wall, electrically operated means on one side of said wall connected to said pin for imparting a rotary motion thereto, lever mechanism on the other side of said wall connecting said pin and said signal member, said lever mechanism moving said signal member vertically.

3. In a signal of the class described, a housing having an intermediate wall therein, a signal member normally concealed within said housing and adapted to be projected thereout of into visible position, means for actuating said signal member into visible position, lever mechanism between said signal member and said means, said intermediate wall provided with a groove therein, and means on said signal member for riding in said groove to guide the signal member in its movement into and out of said housing.

In witness whereof, I hereunto subscribe my name this 8th day of September A. D. 1917.

JAMES B. BLAIR.